July 8, 1969 E. EISNER 3,454,778

PHOTOCHROMIC FILTER FOR ELIMINATING UNWANTED BACKGROUND RADIATION

Filed March 20, 1967

INVENTOR
E. EISNER
BY Charles E. Graves
ATTORNEY

United States Patent Office 3,454,778
Patented July 8, 1969

3,454,778
PHOTOCHROMIC FILTER FOR ELIMINATING UNWANTED BACKGROUND RADIATION

Edward Eisner, Gillette, N.J., assignor to Bell Telephone Laboratories, Incorporated, Murray Hill, N.J., a corporation of New York Filed Mar. 20, 1967, Ser. No. 624,298
Int. Cl. H01j *3/14, 39/12;* G02f *1/28*
U.S. Cl. 250—237 4 Claims

ABSTRACT OF THE DISCLOSURE

A continuously self-adjusting spatially selective optical filter employs an optical imaging system of relatively low resolution together with a member of photochromic material This invention relates to optical filters, and more particularly to a spatially selective optical filter that blocks out light energy density above a selected threshold value while allowing light energy density of lesser value to pass unimpeded.

It occasionally is necessary to receive an optical signal in the presence of an objectionably bright and randomly situated extraneous light source such as the sun or a reflection thereof. If the receiver is one designed to receive modulated or information-bearing optical signals, the bright light causes a substantial level of noise. If the signal is a scene presented to a TV camera fixed for directional shots, a bright light within the lens angle produces the familiar light dazzle or blur on the screen.

One case in which bright light interference with a modulated optical signal is especially critical is the so-called cordless telephone of the type designed to receive modulations impressed on an ambient light. Such an instrument may, for example, receive information-bearing light signals directly from an overhead source of suitably modulated monochromatic "or coherent" light. If during a conversation this instrument's optical signal detector is pointed at the sun or its reflection, a high level of noise is induced in the receiver.

Accordingly, one object of the invention is to detect an optical signal of a certain flux level in the presence of a secondary, extraneous optical signal of substantially higher flux level.

Another object of this invention is to block out light above a predetermined flux level from an optical detector although the angle of incidence of the light on the detector may be varying.

*Invention summary*

This invention achieves these and other objects, broadly, through an optical system comprising an image-forming system such as a lens or a mirror, and a photochromic member placed in or near the plane in which an image of the noise source is projected.

As used herein, the term photochromic member connotes a member having the general characteristic of indefinitely passing all optical flux below a certain threshold range, darkening when exposed even briefly to light energy above the threshold range, and recovering its light-transmissive property when the high power light is no longer incident. The term flux or flux level is a measure of the optical energy impinging upon unit area per unit time.

The invention may be viewed as a spatially selective optical filter with a continuously self-adjusting rejection region. In practice, an image of the desired signal and of the bright light source is formed upon the photochromic material. If the desired signal is contained in the ambient light energy from a lighting fixture, for example, then with suitable orientation of the optical receiver the desired signal will impinge upon some or all of the photochromic surface area. A single point light source such as the sun, however, is focused during any sufficiently small time interval upon a relatively small area of the photochromic surface. The photochromic member is designed to activate, or darken, in response to the flux level produced by the single point light source. Thus, in accordance with the invention, the member darkens in the area of exposure to the image of the noise source. Elsewhere along the photochromic surface, however, the desired signal contained in ambient light energy is passed without alteration because of its low flux level; and is received in an interference-free environment by a photocell detector or the like. As the receiver-detector is moved, a different area of the photochromic surface is exposed to the high flux image and darkens; while the previously exposed area recovers or bleaches.

Other objects of the invention, its features and advantages will be more readily apparent from the description to follow of an illustrative embodiment of the invention.

*Detailed description of an illustrative embodiment*

Figure 1:
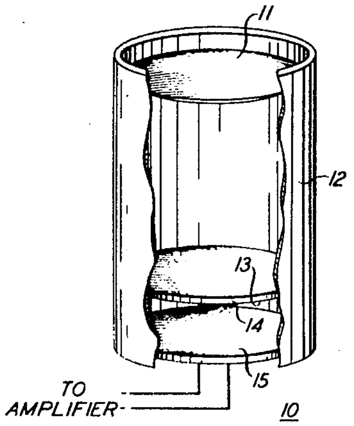
FIG. 1 is a frontal perspective in partial cutaway showing one optical system embodying the invention.

The embodiment of the invention shown in FIG. 1 is an optical system 10 comprising a lens 11 disposed in one end of a lightproof enclosure 12. A region of photochromic material 13 is located in an intermediate portion of enclosure 12; and behind it is a photodetector 15. Photochromic region 13 may comprise a deposit of photochromic material upon a light-transmissive glass plate 14. Advantageously, region 13 may comprise the glass itself.

A relatively thick glass member is necessary to accommodate cases where the source of noise occurs at varying distances from the optical system. In this particular, the present invention differs from optical imaging schemes used in typical information storage systems which must use thin photochromic glass to achieve the requisite high resolution.

Figure 2:
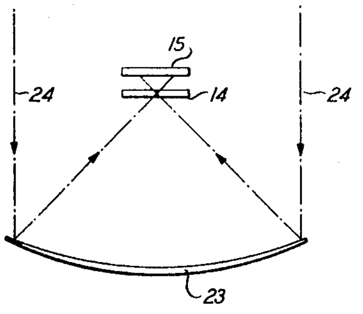
FIG. 2 is a schematic diagram illustrating a further image-forming scheme for practice of the invention.

An alternative image-forming system, depicted in FIG. 2, includes a parabolic mirror 23 which receives optical beams 24 and directs them at a photochromic glass plate 14. Detector 15 detects the nonblocked radiation in the manner explained.

Figure 3:
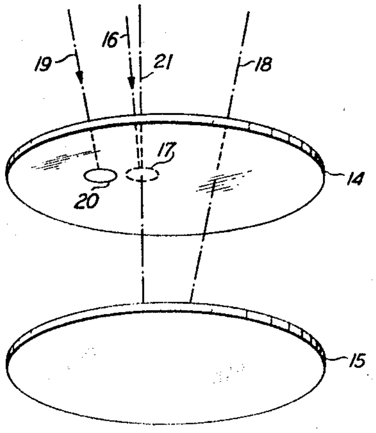
FIG. 3 is a schematic diagram illustrating the working of the invention.

FIG. 3 illustrates schematically a typical operating situation for the invention. A light beam from a high flux source following a path 16 is focused at time $t_1$ upon a random area 17 of plate 14. Area 17 darkens and severely attenuates any further light passing through it. The desired signal, designated 18, passes through some or all of the nondarkened remainder of plate 14. At a later time $t_2$, the light beam from the high density source shifts to path 19, for example; and accordingly, a different area 20 of plate 14 darkens. Removal of the bright light from area 17 enables it to recover or bleach, and in due time become light-transmissive once again as illustrated by light path 21.

Photochromic materials suitable to the practice of this invention are described, inter alia, in W. H. Armistead Patent 3,208,860 issued on Sept. 8, 1964. The optical properties of photochromic glass are discussed in an article by G. K. Megla appearing in Applied Optics, vol. 5, No. 6, p. 945 et seq. These teachings, insofar as they are relevant to the present invention, are hereby incorporated into this disclosure by reference.

The property of photochromism is known to occur in both organic and inorganic compounds. Some of these compounds lose their reversibility after repeated cycles of use; others, such as the borosilicate glass with silver halide crystals described in the mentioned patent of Armistead et al., exhibit no reversibility fatigue regardless of the number of exposures.

Some types of reversible materials are activated, i.e., darkened, when exposed to violet and ultraviolet radiation; and removal of the latter allows the compound to regain the optical density of its original light-transmitting state. Bleaching is enhanced by heat (thermal fading) as well as by visible light of a relatively long wavelength. As reported in the cited article by Megla for example, photochromic borosilicate glasses containing silver halides exhibit maximum activation response at wavelengths between 330 and 450 nanometers, and maxmum bleaching response at wavelengths between 530 and 630 nanometers.

Figure 4:
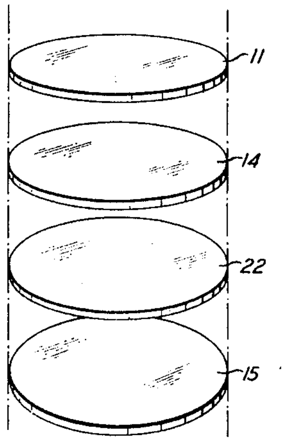
FIG. 4 is a further schematic diagram.

Persons skilled in the art will appreciate that the darkening time and the fade time of a photochromic material employed as taught in the present invention will be critical, each to an extent depending on the application. For example, it may be desirable that the photochromic material activate very rapidly in response to sunlight. To control the activation rate, it may be desirable to alter the spectral content of the light falling upon the photochromic material by filtering techniques well known in the art. Additionally, the desired signal may be present in a relatively narrow band of the optical spectrum. In such case it would be desirable to place a narrow bandpass optical filter such as 22 in FIG. 4 behind the photochromic member 14. It readily will be appreciated that varying the thickness of the photochromic material, favoring the red portion of the spectrum for enhanced fading or favoring the blue-green portion for enhanced darkening, permits a wide range of operating characteristics for the device.

It is to be understood that the embodiments described herein are merely illustrative of the principles of the invention. Various modifications may be made thereto by persons skilled in the art without departing from the spirit and scope of the invention.

What is claimed is:

1. A method for detecting optical signals of a specified flux level emanating from a direction that includes a point source of undesired optical signals at a substantially higher flux level, comprising the steps of:

imaging the desired and undesired optical signals onto a specimen of photochromic material larger in surface area than either image and capable of darkening in response to said higher flux level signals; and detecting the desired signals after they pass through the undarkened region of said specimen.

2. A method for detecting optical signals of a specified flux level emanating from a direction that includes a point source of undesired optical signals at a substantially higher flux level, comprising the steps of:

focusing the desired and undesired optical signals upon an image plane occurring in a remote zone of an opaque, open-ended housing;

blocking out said undesired signals with a photochromic member capable of darkening in response to said higher flux level signals and disposed in said housing beyond said image plane; and receiving the desired signals in a photodetector stationed in said housing beyond said member.

3. The method of claim 1 wherein said photochromic member comprises a relatively thick glass composed of borosilicate with silver halide crystals disposed therein.

4. The method of claim 2 wherein said photochromic member comprises a relatively thick glass composed of borosilicate with silver halide crystals disposed therein.

References Cited

UNITED STATES PATENTS

| | | | |
|---|---|---|---|
| 2,824,235 | 2/1958 | Hahn et al. | |
| 3,185,026 | 5/1965 | Carlson et al. | |
| 3,198,953 | 8/1965 | Peters | 350—266 |
| 3,270,638 | 9/1966 | Anwyl et al. | |
| 3,327,120 | 6/1967 | Weiss. | |

RALPH G. NILSON, *Primary Examiner.*

MARTIN ABRAMSON, *Assistant Examiner.*

U.S. Cl. X.R.

350—160